(12) United States Patent
Franke et al.

(10) Patent No.: US 10,612,519 B2
(45) Date of Patent: Apr. 7, 2020

(54) OPTIMAL WIND FARM OPERATION

(71) Applicant: ABB Schweiz AG, Baden (CH)

(72) Inventors: Carsten Franke, Stetten (CH); Kedar Kulkarni, Bangalore (IN); Adrian Timbus, Dättwil (CH); Jan Poland, Nussbaumen (CH); Silvia Mastellone, Nussbaumen (CH); Yan Zhang, Baden (CH)

(73) Assignee: ABB Schweiz AG, Baden (CH)

( * ) Notice: Subject to any disclaimer, the term of this patent is extended or adjusted under 35 U.S.C. 154(b) by 292 days.

(21) Appl. No.: 15/631,783

(22) Filed: Jun. 23, 2017

(65) Prior Publication Data

US 2017/0284368 A1 Oct. 5, 2017

Related U.S. Application Data

(63) Continuation of application No. PCT/EP2015/078174, filed on Dec. 1, 2015.

(30) Foreign Application Priority Data

Dec. 23, 2014 (EP) .................................... 14200106

(51) Int. Cl.
*F03D 7/02* (2006.01)
*F03D 7/04* (2006.01)

(52) U.S. Cl.
CPC ......... *F03D 7/0292* (2013.01); *F03D 7/0204* (2013.01); *F03D 7/048* (2013.01);
(Continued)

(58) Field of Classification Search
CPC ...... F03D 7/0292; F03D 7/0204; F03D 7/048; F03D 7/04; F03D 7/02; Y02E 10/723
(Continued)

(56) References Cited

U.S. PATENT DOCUMENTS 8,606,418 B1 12/2013 Myers et al.
9,127,642 B2 * 9/2015 Zhu ....................... F03D 7/0288
(Continued)

FOREIGN PATENT DOCUMENTS

CN 101896872 A 11/2010
CN 102663251 A 9/2012
(Continued)

OTHER PUBLICATIONS

China National Intellectual Property Administration; First Chinese Office Action Dated Oct. 8, 2018; Chinese Application No. 201580070744.3; 16 pgs. (including translation).
(Continued)

*Primary Examiner* — Kenneth M Lo
*Assistant Examiner* — Mohammed Shafayet
(74) *Attorney, Agent, or Firm* — Taft Stettinius & Hollister LLP; J. Bruch Schelkopf

(57) ABSTRACT

The present invention relates to a method of operating a wind farm comprising an upstream and a downstream turbine, wherein the upstream turbine is operated with current operation parameters under current wind conditions, wherein the method comprises the steps of: receiving future wind conditions for a time period for the wind farm, and evaluating required operation parameters for minimising wake effect of the downstream turbine under the future wind conditions, and determining a cost coefficient for changing the operation parameters to required operation parameters under consideration of fatigue effect of the wind turbine, calculating power productions $P_0$ and $P_c$, in the predetermined time period, by the wind farm if operated with the current operation parameters under the current wind conditions and if operated with the required operation parameters under the future wind conditions, respectively, and operating the upstream turbine with the required operation parameters (Continued)

if the cost coefficient is lower than a cost that would be obtained by a power production increment $P_c$-$P_0$.

22 Claims, 4 Drawing Sheets

(52) U.S. Cl.
CPC .................. *F03D 7/02* (2013.01); *F03D 7/04* (2013.01); *Y02E 10/723* (2013.01)

(58) Field of Classification Search
USPC ......................................................... 700/276
See application file for complete search history.

(56) References Cited

U.S. PATENT DOCUMENTS

| | | | | |
|---|---|---|---|---|
| 2007/0124025 A1* | 5/2007 | Schram | ................ | F03D 7/0224 700/287 |
| 2008/0079263 A1* | 4/2008 | Morjaria | ............... | F03D 7/0284 290/44 |
| 2009/0099702 A1* | 4/2009 | Vyas | ...................... | F03D 7/0292 700/287 |
| 2010/0138201 A1* | 6/2010 | Gundling | ................ | F03D 7/043 703/9 |
| 2010/0274401 A1 | 10/2010 | Kjaer et al. | | |
| 2011/0101691 A1* | 5/2011 | Hashimoto | ........... | F03D 7/0204 290/44 |
| 2011/0144814 A1* | 6/2011 | Menke | .................... | F03D 7/026 700/287 |
| 2012/0185414 A1* | 7/2012 | Pyle | ........................ | G01W 1/10 706/11 |
| 2013/0166082 A1* | 6/2013 | Ambekar | ................ | G05B 13/04 700/287 |
| 2013/0264823 A1* | 10/2013 | Christiansen | ............. | F03D 7/04 290/44 |
| 2013/0300115 A1* | 11/2013 | Seem | ........................ | H02P 9/04 290/44 |
| 2013/0317748 A1* | 11/2013 | Obrecht | ................... | F03D 7/048 702/3 |
| 2014/0037447 A1* | 2/2014 | Attia | ........................ | F03D 17/00 416/1 |
| 2014/0193254 A1* | 7/2014 | Gopolan | ................. | F03D 7/022 416/1 |
| 2014/0203560 A1* | 7/2014 | Gerber | .................. | F03D 7/0224 290/44 |
| 2014/0203562 A1* | 7/2014 | Black | ...................... | F03D 7/043 290/44 |
| 2014/0241882 A1* | 8/2014 | Caruso | .................. | F03D 7/0268 416/17 |
| 2014/0253055 A1* | 9/2014 | Wei | ......................... | H02M 1/32 322/47 |
| 2014/0336833 A1* | 11/2014 | Marinopoulos | ......... | G01W 1/10 700/291 |
| 2015/0050144 A1* | 2/2015 | Westergaard | ........... | F03D 7/028 416/1 |
| 2015/0167637 A1* | 6/2015 | Kooijman | ................ | F03D 7/02 416/1 |
| 2015/0308416 A1* | 10/2015 | Ambekar | ................ | F03D 17/00 700/287 |
| 2015/0345476 A1* | 12/2015 | Gregg | ..................... | F03D 7/048 702/92 |
| 2016/0146190 A1* | 5/2016 | Ravindra | ................ | F03D 7/048 290/44 |
| 2016/0230741 A1* | 8/2016 | Brath | ..................... | F03D 7/0224 |
| 2016/0377058 A1* | 12/2016 | Caponetti | ............ | F03D 7/0224 416/1 |
| 2017/0002796 A1* | 1/2017 | Spruce | .................. | F03D 7/0292 |

FOREIGN PATENT DOCUMENTS

| | | |
|---|---|---|
| CN | 103353979 A | 10/2013 |
| CN | 107250532 A | 10/2017 |
| EP | 1790851 A2 | 5/2007 |
| EP | 2557311 A1 | 2/2013 |

OTHER PUBLICATIONS

National Intellectual Property Administration, P.R. China; English Translation of Chinese Search Report; Chinese Application No. 201580070744.3; 3 pgs.
European Patent Office, International Search Report and Written Opinion issued in corresponding Application No. PCT/EP2015/078174, dated Mar. 7, 2016, 11 pp.
European Patent Office, International Preliminary Report on Patentability issued in corresponding Application No. PCT/EP2015/078174, dated Mar. 24, 2017, 18 pp.
European Patent Office, Extended Search Report issued in corresponding Application No. 14200106.4, dated Jul. 3, 2015, 5 pp.

* cited by examiner

OPTIMAL WIND FARM OPERATION

FIELD OF THE INVENTION

The invention relates to operation of wind farms including a plurality of wind turbines, in particular to a method of operating a wind farm with an upstream wind turbine and a downstream wind turbine.

BACKGROUND OF THE INVENTION

Wind turbines convert kinetic energy of wind into electrical energy. In a wind farm, the first row of turbines that encounters the free-stream wind-speed can potentially extract maximal energy from wind. However, due to this energy extraction by such upstream or upwind turbines, the downstream or downwind turbines experience lower wind-speeds and turbulent wind conditions due to rotational motion of the rotor blades of upwind turbines. This phenomenon, widely known as 'wake effect', may have the following impact: (a) the amount of electrical energy realized by downwind turbines reduces considerably since power generated by wind turbines is proportional to the cube of the wind-speed, and (b) the life-time of the downstream wind turbine reduces since wake-induced turbulences increase component wear and tear at the downwind turbines.

In order to minimize the impact of the wake effects a wind farm turbine layout is designed such that there is reduced wake interaction based on statistical information regarding wind speed and wind direction in the farm. However, it may be difficult or even impossible to reduce the impact of wakes in real time when wake propagation depends on the dynamically changing wind directions and speeds.

Conventional wind farm management is mainly based on local control. That is, a wind farm controller only sends set-points regarding active and reactive power generation to individual wind turbines and then tries to vary these set-points in order to meet the demand at the point of common coupling with the electrical grid. However, wake interactions are not accounted for in the dispatch of these set-points. Moreover, local control at each individual wind turbine optimizes the active and reactive power generation only locally. Thus, while local control may be beneficial on an individual turbine level, it may not maximize energy from a farm perspective, due to the aforementioned aerodynamic wake interactions.

The local control of each wind turbine locally is mainly based on three types of mechanical actuators or wind turbine operation parameters including yaw control, pitch control, and torque control. Depending on the settings of these actuators the turbine can extract different amounts of energy, but these settings also directly influence the resulting wakes and thus the possible power generation at downwind turbines. Therefore, the overall power generation for the whole wind farm may be further improved if a coordinated behavior is ensured.

Any solution at the wind farm level has to be able to control all turbines to improve the overall power extraction, and to that purpose, account for aerodynamic wake interactions between turbines. Various studies propose different avenues to minimize wake interaction thus improving operational farm performance. For instance, controlling the amount of energy extracted by upwind turbines influences the wind energy made available for the downwind turbines. The controlling actuators or parameters include the axial induction factor, e.g. by controlling blade pitch and generator torque, yaw misalignment, or both. Pitch and torque control are commonly used in most modern variable-speed horizontal axis turbines under a maximum power point tracking perspective. Yawing the upwind turbine deliberately will deflect the wake behind the upstream turbine such that the downstream turbine is only partially located or not located in the wake of the upstream turbine anymore. As a result, the downwind turbine may potentially capture more energy thus increasing the energy capture at farm level.

The patent application EP 1790851 A2 discloses a method for operating a wind park including a central control unit receiving data from each of a plurality of wind turbines of the park. These data are used to predict load impact on downstream turbines. Control signals to selected turbines are subsequently transmitted to minimize load impact on downstream turbines and/or to reduce fatigue load of upstream turbines and to increase power capture of downstream turbines. Data received by the central control unit comprise measurements of wind velocities and directions at each turbine tower. The central control unit can use a measured change in wind conditions at an upstream turbine to send advance control demands to a downstream turbine. It is further suggested to use knowledge of wake interactions to make control decisions minimizing loads.

DESCRIPTION OF THE INVENTION

It is an objective of the invention to improve the operation of a wind farm under consideration of a wind condition forecast. A method and a controller according to the independent claims achieve this objective. Preferred embodiments are evident from the dependent patent claims.

According to the present invention, a change or adaptation in operational parameters that results, under a pure wake-effect-minimization point-of-view, in increased energy generation at forecast wind conditions may be questioned if an expense or effort for changing the parameters is properly taken into account. In other words, the upstream turbine is operated with changed operational parameter values only if the expense for changing the operational parameters is actually outweigh by an expected power production increase. In particular, if forecast wind conditions should indicate a return to previous wind conditions, a corresponding back-and-forth change of operational parameter values to minimize wake effects during a transitional period of changed wind conditions may be suppressed. An exemplary yaw angle control system may thus avoid frequent and/or minor yaw movements that would excessively affect a component lifetime or even lead to actuator damage.

Specifically, in a wind farm with an upstream wind turbine and a downstream wind turbine the upstream turbine is operated with, or according to, a current, or present, upstream operation parameter value under current wind conditions. The operation parameter is one of a yaw angle indicative of an alignment between a wind direction at the upstream turbine and a rotor axis of the upstream turbine, a pitch angle indicative of an alignment between the wind direction and a rotor blade orientation, a generator torque or a rotor speed, and the wind conditions include a wind speed and a wind direction. A method of operating the wind farm comprises the following steps:

Obtaining, for each time interval, or time step, of a sequence of time intervals of a forecast time period, forecast wind conditions at the upstream wind turbine and at the downstream wind turbine (10).

Determining a candidate upstream operation parameter sequence with an upstream operation parameter value for each of the time intervals of the sequence of time intervals that minimizes, if the upstream turbine is operated accordingly, a wake effect at the downstream turbine over the forecast time period and under the forecast wind conditions (12).

Estimating a parameter change expense indicative of, or incurred by, a change from the current upstream operation parameter value to a first upstream operation parameter value of the candidate upstream operation parameter sequence and optionally indicative of further parameter value changes in the candidate upstream operation parameter sequence (14). The parameter change expense may include an energy required to operate a driving motor or other actuator for incrementally moving or adjusting turbine parts such as the nacelle (yaw angle) or rotor blades (pitch angles) according to the change in the operation parameter, or include a corresponding cost. The parameter change expense may be respective of component wear, including fatigue effects, suffered by the driving motor and/or moving turbine parts, and may specifically include wear of yaw bearings resulting from mechanical load moments due to inertia, friction and gyro moments exerted on the yaw bearings in case of a yawing turbine rotor. Component wear may include a reduction in energy generated over a decreased lifetime of the driving motor and/or moving turbine parts, or include a corresponding reduction in earnings. Alternatively, the expense may include a cost for maintenance or premature replacement of the driving motor and/or moving turbine parts.

Estimating wind farm productivity, or output, during the forecast time period if the upstream turbine is operated under the forecast wind conditions with the current upstream operation parameter value or according to the candidate upstream operation parameter sequence, respectively (16). The productivity includes an amount of electrical energy generated or corresponding earnings.

Calculating a wind farm productivity gain as a difference between the wind farm productivity according to the candidate upstream operation parameter sequence and the wind farm productivity with the current upstream operation parameter value (18).

Operating the upstream turbine, at a first time interval of the sequence of time intervals, according to at least a first upstream operation parameter value of the candidate upstream operation parameter sequence if the productivity gain exceeds the parameter change expense (24), and with the current upstream operation parameter value if the parameter change expense exceeds the productivity gain (22).

In a preferred embodiment, the method takes into account an increase in fatigue loads of the upstream turbine caused by misalignment of the turbine rotor with the wind direction. The latter may induce azimuthal load variation in the upstream wind turbine and mechanical stress on the rotor, which in turn affects the lifetime of the upstream turbine. Specifically, the method further comprises the following steps:

Estimating a fatigue effect of the upstream wind turbine if operated according to the candidate upstream operation parameter sequence rather than with the current upstream operation parameter value, under the forecast wind conditions during the forecast time period. The fatigue effect may include a reduction in energy generated over a lifetime of the turbine, estimated for instance based on historical data, or include a corresponding reduction in earnings. Alternatively, the fatigue effect may include a cost for maintenance or premature replacement of the turbine or of rotating parts thereof. A paper by Juelsgaard, M. at al. entitled "Wind Farm Dispatch Control for Demand Tracking and Minimized Fatigue", Power Plants and Power Systems Control, Volume #8|Part #1, pages 381-386 (2012), DOI 10.3182/20120902-4-FR-2032.00068, discloses exemplary fatigue modelling in wind turbines.

Operating the upstream turbine based on a forecast balance including the productivity gain, the parameter change expense, and the fatigue effect. Specifically, the fatigue effect may be subtracted from the change expense, or added to the productivity gain.

In a preferred embodiment, the forecast time period has a length or duration largely exceeding a duration of an actuator operation for executing a typical change in upstream operation parameter value, and limited by a reliability of the wind condition forecast. With yaw angle change rates of less than one degree per second, the length of the forecast time period is therefore in excess of ten seconds, preferably between one minute and one to three hours, with time intervals of one to five minutes. It is understood that wake effect, parameter change expense, productivity gain, and fatigue effect all may be evaluated, and suitably integrated or averaged, over the forecast period, with a time interval or step size depending on the coarseness of the wind condition forecast data.

In a specific example, the present invention considers the yaw angle as the upstream operation parameter, and the upstream turbine is operated with a yaw angle $\gamma_0$ under current wind conditions. A wind farm controller 8 is adapted to communicate with a local controller at the upstream turbine and configured to receive future wind conditions for a predetermined time window based on a wind forecast for the wind farm. The wind farm controller 8 is further adapted to calculate a yaw angle $\gamma_c$ for minimising wake effects of the downwind turbine under the future wind conditions, and to determine a cost for changing the yaw angle from $\gamma_0$ to $\gamma_c$ under consideration of driving motor involvement as well as wear and fatigue effects at the upstream turbine. The wind farm controller 8 is ultimately adapted to calculate power productions $P_0$ and $P_c$ of the wind farm under the future wind conditions in the predetermined time period, assuming the upstream turbine being operated with the yaw angle $\gamma_0$ and $\gamma_c$ respectively, and to set the yaw angle to $\gamma_c$ if the cost is lower than a profit of a power production increment $P_c - P_0$.

The present invention changes the conventional method of controlling a wind farm in several ways. While the existing methods focus mostly on controlling the current state of operation, the present invention proposes extending it to the near-term future too. This covers decisions made based on immediate future, e.g. seconds or minutes, but can also cover up to an hour and all time durations in between.

Wind predictions combined with wake models can provide very valuable input for the control of a wind farm. Using the proposed concept, it is possible to decide whether or not to change a yaw angle and if it is to change then by how many degrees. This decision can easily include economic aspects by accounting for the costs of changing the yaw angle of individual wind turbines as the driving motors wear out. These costs can then be compared with the increasing profit gained due to the resulting power production and the decrease in fatigue for the wind turbine due to the better alignment. At the same time, the resulting wakes and the possible power production at down-wind turbines can also be analyzed. Furthermore, the shapes of the resulting wakes can be optimized in order to further increase the power production capabilities and to minimize the overall resulting fatigue.

Inclusion of time durations enables the optimization approach to integrate the costs and benefits over time. This can lead to a completely different decision compared with the pure local control. Thus, for instance, it can be beneficial to accept a yaw misalignment for some time as long as the loss in power production and the increased fatigue as integrals over time do not exceed the cost of changing the yaw angle. Such a case makes sense especially if it is known from the wind forecast that a previous state (with perfect yaw alignment) will recur in reasonable time and hence a temporary misalignment is permissible.

According to a further aspect, the present invention considers the use of wind-speed and direction predictions to choose an appropriate method in order to realize the wind farm or wind operator objective by modifying pitch, torque and/or yaw control or combinations thereof.

According to a further aspect, the present invention considers the integration of short, e.g. a second to a minute, and medium-term, e.g. minute to an hour, forecasts to decide pro-actively on yaw angle changes while accounting for the trade-off between the cost/time of realizing the proposed yaw angle change vs. the projected energy capture benefit and the accompanying decrease in fatigue effects on all the wind farm equipment.

According to a further aspect, the present invention also considers dynamic identification of yaw angle errors and subsequent decision regarding correction of these errors using wind forecasts, based on the projected cost/time of doing so vs. the energy benefit it will bring if yaw error is indeed corrected.

BRIEF DESCRIPTION OF THE DRAWINGS

The subject matter of the invention will be explained in more detail in the following text with reference to preferred exemplary embodiments that are illustrated in the attached drawings, in which.

DETAILED DESCRIPTION OF PREFERRED EMBODIMENTS

According to an exemplary embodiment, the present invention analyses the wind changes and the forecast predicts in a stable and long-term change. If the wind forecast predicts stable wind situations for a sufficiently long period of time and the cost of changing the yaw angle is lower than the accompanying increase in energy production and/or decrease in fatigue loads, then it makes economic sense to change the yaw angle. However, if such effects can only be observed for shorter periods of time, the change of yaw angles may not be advisable.

Additionally, yawing can even be used pro-actively in such a way that anticipated wind direction and speed changes that the wind farm control knows about (through wind forecasts) can lead to earlier movements of the yawing. This particularly addresses the slow yaw angle changes that are currently existing (about 8 degrees per minute).

According to an exemplary embodiment, the present invention analyses the wind changes and the forecast predicts in a short-term effect. If the wind forecast predicts wind situations to change only for a short period of time, the yaw angle should not be changed (in contrast to pitch/yaw control) as the time and the costs for the changes would be too large compared with the short period of increasing the energy production of the overall wind farm.

According to an exemplary embodiment, the present invention analyses changing the yaw angles of up-wind turbines to reduce the impact of wakes on down-wind turbines.

Figure 1A:
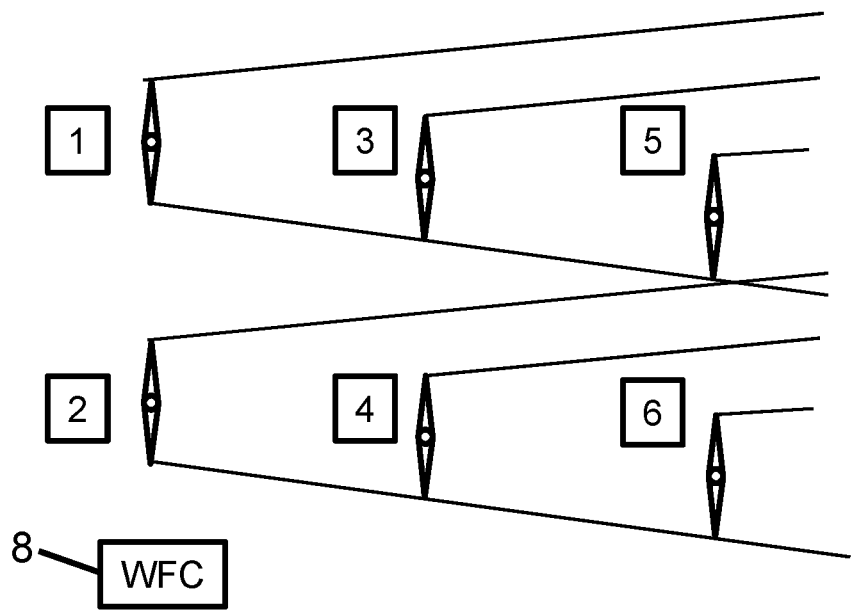
FIG. 1 schematically shows top view of the wind farm wake configuration, where (a) is before yawing and (b) after yawing, wherein the turbine 1 and 2 are yawed in (b) leading to a decrease in produced energy by turbines 1 and 2, but an increase in produced energy by turbines 3-6.
Figure 1B:
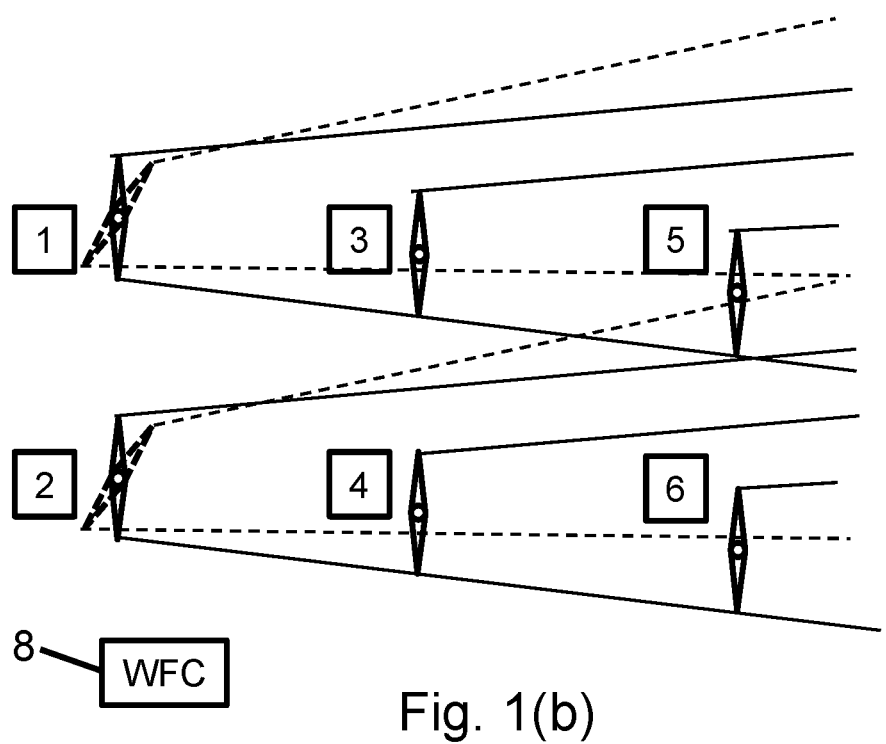

As shown in FIG. 1, the yaw angle of the upwind turbines are changed such that the wakes do not 'shadow' the full rotor areas of the down-wind turbines anymore. This reduces the power production of the upwind turbine but increases the power production at downwind turbines due to reduced impact of wakes. This can potentially lead to a higher energy production for the overall wind farm.

Figure 2:
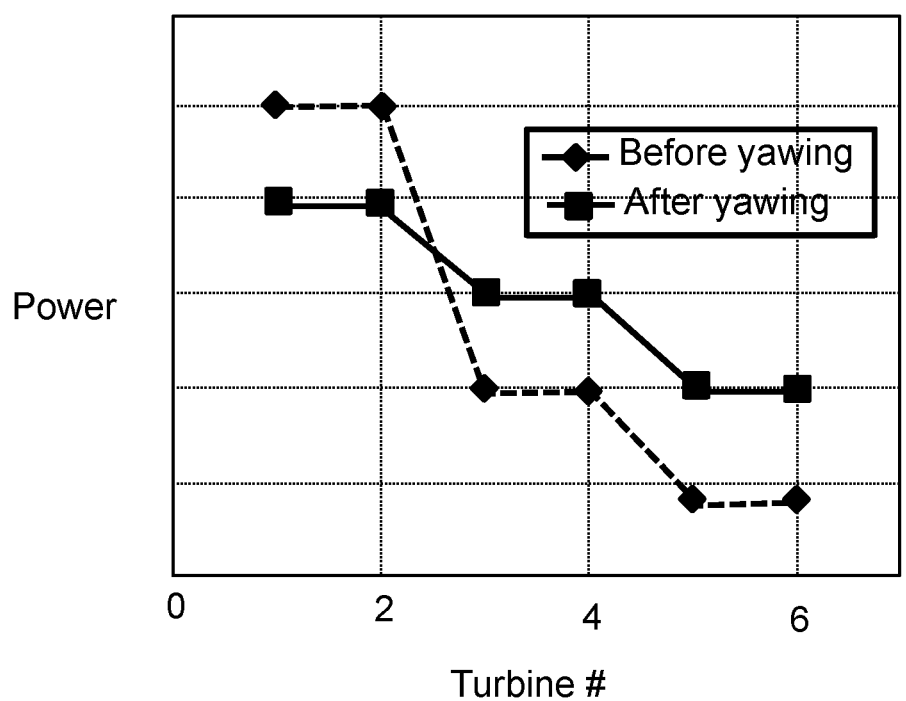
FIG. 2 illustrates the power productions of turbines before and after yawing for the farm configuration shown in FIG. 1, where yawing turbine 1 and 2 reduces their energy capture, however, it can also result in downwind turbines gaining energy due to reduced 'shadowing' as depicted in FIG. 1b.

FIG. 2 shows the power productions of several wind turbines in sequence for a given initial wind speed and direction and then for the yaw optimized version.

Figure 3:
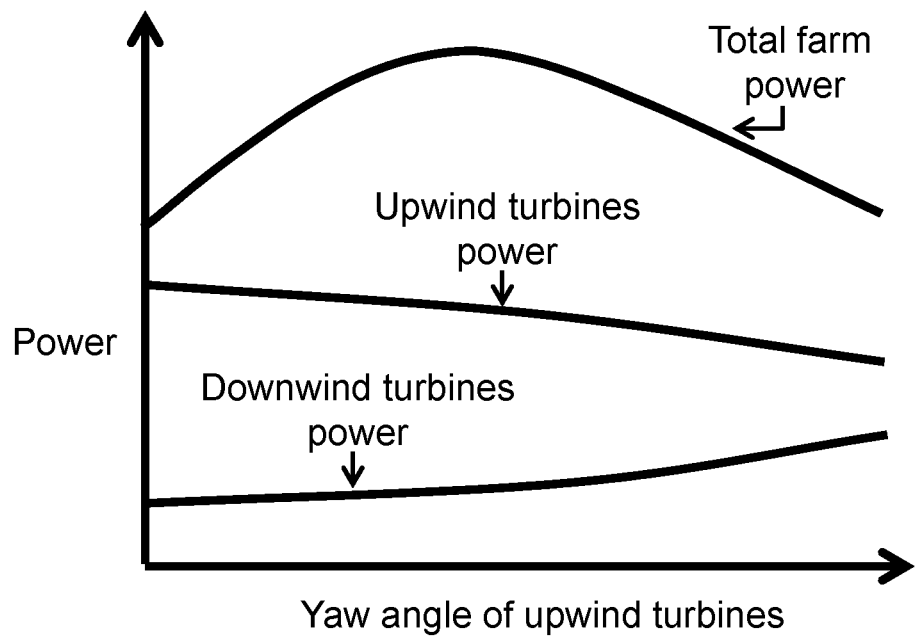
FIG. 3 schematically shows the trends of the total farm power, upwind and downwind turbines power as a function of the changing yaw angles of upwind turbines 1 and 2.

In FIG. 3, the corresponding power productions and the sum are plotted as a function of the yaw angles of the upwind turbines. Since upwind turbines power decreases with the yaw angles and the downwind turbines power increases with the yaw angles, the total farm power goes through a maximum as a result of this trade-off. This demonstrates the achievable benefits.

Figure 4:
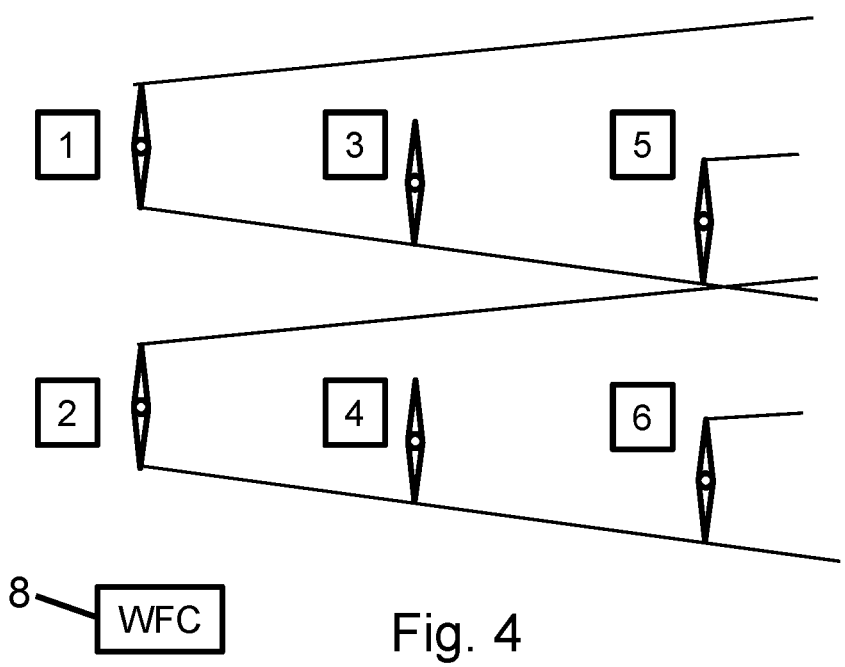
FIG. 4 shows turbine 3 and 4 being shut off and hence do not produce any wakes that will affect turbines 5 and 6, thus, turbines 5 and 6 are affected only by wakes produced by upwind turbines 1 and 2.
Figure 5:
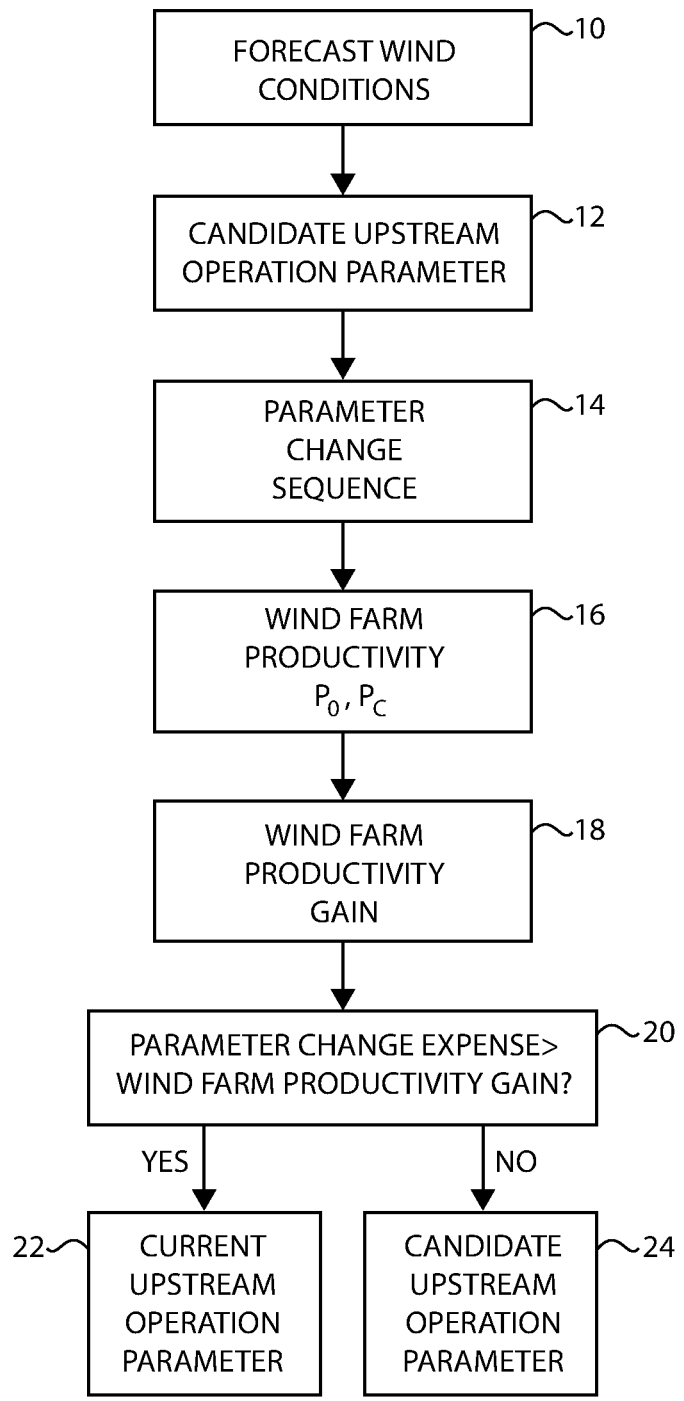
FIG. 5 is a flow chart of the method of operating a wind farm with an upstream turbine and a downstream turbine.

According to an exemplary embodiment, the present invention analyses changing the yaw angles of upwind turbines to reduce the impact of wakes on downwind turbines. As shown in FIG. 4, when some of the turbines are switched off, e.g. operation stopped, they do not produce wakes anymore. Thus, the previous and the next row of turbines have fewer limitations. Especially in low wind conditions, the power generation of the overall wind farm can be similar to the case where all turbines are used but in this setup life-time effects can be optimized for the rows that are not operating.

In an embodiment of the present invention, the integration of short, e.g. a second to a minute, and medium-term, 1 minute to an hour, forecasts to decide pro-actively on yaw angle changes while accounting for the trade-off between the cost/time of realizing the proposed yaw angle change vs. the projected energy capture benefit and the accompanying increase in fatigue effects on all the wind farm equipment.

The same effect of reducing wakes between turbines can be achieved the by pitch control, torque control, or by choosing either all or any combination of yaw control, pitch control, torque control.

According to a further embodiment, the present invention can decide if it is advantage to temporarily switch off selected turbines to achieve similar wake savings.

According to a further embodiment, assuming the settings for optimal yaw control, the present invention uses a dynamic identification of yaw angle errors and subsequent decision regarding correction of these errors using wind forecasts, based on the projected cost/time of doing so vs. the energy benefit it will bring if yaw error is indeed corrected.

According to a further embodiment, the present invention observes a steady state, e.g. constant wind conditions, the system can once optimize the yaw angles for the whole wind farm to optimize the given wind farm owner's objective. The optimization can use any combination of yaw angles, pitch control, and torque control.

While the invention has been described in detail in the drawings and foregoing description, such description is to be considered illustrative or exemplary and not restrictive. Variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

The features of the method of operating a wind farm and the wind farm controller as described herein may be performed by way of hardware components, firmware, and/or a computing device having processing means programmed by appropriate software. For instance, the wind farm controller can include any known general purpose processor or integrated circuit such as a central processing unit (CPU), microprocessor, field programmable gate array (FPGA), Application Specific Integrated Circuit (ASIC), or other suitable programmable processing or computing device or circuit as desired. The processor can be programmed or configured to include and perform features of the exemplary embodiments of the present disclosure such as a method of operating a wind farm. The features can be performed through program or software code encoded or recorded on the processor, or stored in a non-volatile memory accessible to the processor, such as Read-Only Memory (ROM), erasable programmable read-only memory (EPROM), or other suitable memory or circuit as desired. In another exemplary embodiment, the program or software code can be provided in a computer program product having a non-transitory computer readable recording medium such as a hard disk drive, optical disk drive, solid state drive, or other suitable memory device or circuit as desired, the program or software code being transferable or downloadable to the processor for execution when the non-transitory computer readable medium is placed in communicable contact with the processor.

The invention claimed is:

1. A method of operating a wind farm with an upstream turbine and a downstream turbine, wherein the upstream turbine is operated with a current upstream operation parameter value under current wind conditions, the method comprising the steps of:

obtaining, for each time interval of a sequence of time intervals of a forecast time period, forecast wind conditions at the upstream wind turbine and at the downstream wind turbine, determining a candidate upstream operation parameter sequence minimizing a wake effect at the downstream turbine under the forecast wind conditions, estimating a parameter change expense indicative of a change from the current upstream operation parameter value to a first upstream operation parameter value of the candidate upstream operation parameter sequence, estimating wind farm productivity $P_0$ during the forecast time period if the upstream turbine is operated under the forecast wind conditions with the current upstream operation parameter value, estimating wind farm productivity $P_c$ during the forecast time period if the upstream turbine is operated under the forecast wind conditions according to the candidate upstream operation parameter sequence, calculating a wind farm productivity gain as a difference $(P_c-P_0)$ between the wind farm productivity according to the candidate upstream operation parameter sequence and the wind farm productivity with the current upstream operation parameter value, and operating the upstream turbine with the current upstream operation parameter value if the parameter change expense exceeds the productivity gain.

2. The method of claim 1, wherein
wake effect, parameter change expense, productivity gain, and/or a fatigue effect are evaluated over the forecast time period.

3. The method of claim 1, wherein
the wake effect, the parameter change expense, the productivity gain, and/or the fatigue are integrated or averaged over the forecast time period.

4. The method of claim 1, comprising:
estimating a parameter change expense including an energy consumed by a driving motor for moving turbine parts of the upstream turbine when operating the driving motor according to a change in the upstream operation parameter from the current upstream operation parameter value to a first upstream operation parameter value of the candidate upstream operation parameter sequence.

5. The method of claim 1, comprising:
estimating a parameter change expense including a component wear suffered by the driving motor or by the moving turbine parts, when operating the driving motor according to a change in the upstream operation parameter from the current upstream operation parameter value to a first upstream operation parameter value of the candidate upstream operation parameter sequence.

6. The method of claim 1, comprising:
estimating a fatigue effect of the upstream wind turbine if operated according to the candidate upstream operation parameter sequence rather than with the current upstream operation parameter value under the forecast wind conditions during the forecast time period, and
operating the upstream turbine based on a forecast balance including the parameter change expense, the productivity gain, and the fatigue effect.

7. The method of claim 1, wherein a length of the forecast time period is between one minute and three hours.

8. The method of claim 1, wherein the operation parameter comprises one of a yaw angle indicative of an alignment between a wind direction at the upstream turbine and a rotor axis of the upstream turbine, a pitch angle indicative of an alignment between the wind direction and a rotor blade orientation, a generator torque or a rotor speed.

9. The method of claim 3, comprising:
estimating a parameter change expense including an energy consumed by a driving motor for moving turbine parts of the upstream turbine when operating the driving motor according to a change in the upstream operation parameter from the current upstream operation parameter value to a first upstream operation parameter value of the candidate upstream operation parameter sequence.

10. The method of claim 9, comprising:
estimating a parameter change expense including a component wear suffered by the driving motor or by the moving turbine parts, when operating the driving motor according to a change in the upstream operation parameter from the current upstream operation parameter value to a first upstream operation parameter value of the candidate upstream operation parameter sequence.

11. The method of claim 10, comprising:
estimating a fatigue effect of the upstream wind turbine if operated according to the candidate upstream operation parameter sequence rather than with the current upstream operation parameter value under the forecast wind conditions during the forecast time period, and
operating the upstream turbine based on a forecast balance including the parameter change expense, the productivity gain, and the fatigue effect.

12. The method of claim 11, wherein a length of the forecast time period is between one minute and three hours.

13. The method of claim 12, wherein the operation parameter comprises one of a yaw angle indicative of an alignment between a wind direction at the upstream turbine and a rotor axis of the upstream turbine, a pitch angle indicative of an alignment between the wind direction and a rotor blade orientation, a generator torque or a rotor speed.

14. The method of claim 7, wherein a length of the forecast time period is between three and five minutes.

15. The method of claim 14, wherein the operation parameter comprises one of a yaw angle indicative of an alignment between a wind direction at the upstream turbine and a rotor axis of the upstream turbine, a pitch angle indicative of an alignment between the wind direction and a rotor blade orientation, a generator torque or a rotor speed.

16. The method of claim 1, wherein
the wake effect, the parameter change expense, the productivity gain, and/or the fatigue are integrated or averaged over the forecast time period with a time interval or step size depending on the coarseness of the forecast wind conditions.

17. A controller for operating a wind farm comprising an upstream turbine and a downstream turbine, wherein the upstream turbine is operated with a yaw angle $\gamma_0$ under current wind conditions, wherein the controller is configured to:
receive future wind conditions for a predetermined time period based on a wind forecast for the wind farm,
calculate a yaw angle $\gamma_c$ for minimizing wake effect at the downstream turbine under the future wind conditions,
determine a cost for changing the yaw angle from $\gamma_0$ to $\gamma_c$,
calculate power production $P_0$ of the wind farm under the future wind conditions in the predetermined time period, assuming the upstream turbine being operated with the yaw angle $\gamma_0$ under current wind conditions and,
calculate power production $P_c$ of the wind farm under the future wind conditions in the predetermined time period, assuming the upstream turbine being operated with the yaw angle $\gamma_c$ for minimizing the wake effect at the downstream turbine,
set the yaw angle to $\gamma_c$ if the cost is lower than a profit of a power production increment $P_c$-$P_0$.

18. The controller of claim 17, wherein said controller is further configured to determine a cost for changing the yaw angle from $\gamma_0$ to $\gamma_c$ under consideration of driving motor involvement.

19. The controller of claim 17, wherein said controller is further configured to determine a cost for wear and fatigue effects at the upstream turbine.

20. The controller of claim 17, wherein said controller is further configured to evaluate wake effect, parameter change expense, productivity gain, and/or a fatigue effect over the forecast time period.

21. The controller of claim 20, wherein said controller is further configured to integrate or average wake effect, parameter change expense, productivity gain, and/or a fatigue effect over the forecast time period.

22. The controller of claim 20, wherein said controller is further configured to integrate or average wake effect, parameter change expense, productivity gain, and/or a fatigue effect over the forecast time period with a time interval or step size depending on the coarseness of the forecast wind conditions.

* * * * *